(12) United States Patent
Duvall et al.

(10) Patent No.: US 7,633,719 B2
(45) Date of Patent: Dec. 15, 2009

(54) FLUIDIC STRIPPER ASSEMBLY WITH LOAD/UNLOAD RAMP

(75) Inventors: Matthew Glenn Duvall, Oklahoma City, OK (US); Cory Bert Welscher, Belle Plaine, MN (US); Kenneth Lee Pottebaum, Lakeville, MN (US); Jackson Wagner Nichols, Belle Plaine, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/963,569

(22) Filed: Dec. 21, 2007

(65) Prior Publication Data

US 2008/0094757 A1 Apr. 24, 2008

Related U.S. Application Data

(63) Continuation of application No. 10/869,446, filed on Jun. 16, 2004, now abandoned.

(51) Int. Cl.
*G11B 17/02* (2006.01)
*G11B 33/14* (2006.01)

(52) U.S. Cl. ............... 360/254.7; 360/254.8; 360/97.02

(58) Field of Classification Search ............... 360/254.7, 360/254.8, 97.02
See application file for complete search history.

(56) References Cited

U.S. PATENT DOCUMENTS

| | | |
|---|---|---|
| 5,134,530 A | 7/1992 | Hall |
| 5,585,980 A | 12/1996 | Boutaghou |
| 5,898,545 A | 4/1999 | Schirle |
| 6,449,119 B1 | 9/2002 | Hashizume et al. |
| 6,549,365 B1 | 4/2003 | Severson |
| 6,600,625 B1 | 7/2003 | Munninghoff et al. |
| 6,987,640 B2 | 1/2006 | Tsang et al. |
| 7,006,324 B1 | 2/2006 | Oveyssi et al. |
| 7,119,986 B2 | 10/2006 | Alt et al. |
| 7,133,249 B2 | 11/2006 | Miyajima |
| 7,136,246 B2 | 11/2006 | Khanna et al. |
| 2002/0015255 A1 | 2/2002 | Tadepalli et al. |
| 2002/0036862 A1 | 3/2002 | Tsang et al. |
| 2002/0060883 A1* | 5/2002 | Suzuki .................... 360/254.7 |
| 2004/0240112 A1 | 12/2004 | Lee et al. |

* cited by examiner

*Primary Examiner*—Jefferson Evans
(74) *Attorney, Agent, or Firm*—Fellers, Snider, et al.

(57) ABSTRACT

An apparatus which provides improved positional control for an access element moveable adjacent a rotatable surface, such as a data transducing head adjacent a data recording disc in a data storage device. The apparatus comprises a fluidic stripper with one or more cantilevered arms which project proximate a corresponding array of one or more rotatable surfaces. Each arm comprises an edge surface which extends proximate to and in facing relationship with a movement path of an access element across the associated rotatable surface to impede fluidic currents established by rotation of the rotatable surface. Each arm further supports a ramp structure which receivingly supports the access element at a position away from the rotatable surface and proximate the innermost diameter during a deactivated mode when the rotatable surface is stationary.

18 Claims, 4 Drawing Sheets

FLUIDIC STRIPPER ASSEMBLY WITH LOAD/UNLOAD RAMP

RELATED APPLICATIONS

This application is a continuation application of U.S. patent application Ser. No. 10/869,446 entitled "Fluidic Stripper Assembly with Load/Unload Ramp," filed Jun. 16, 2004 now abandoned.

FIELD OF THE INVENTION

The claimed invention relates generally to the field of fluidic control devices and more particularly, but not by way of limitation, to an apparatus for controlling an access element adjacent a rotatable surface.

BACKGROUND

Digital data storage devices are used to store and retrieve large amounts of user data in a fast and efficient manner. A typical data storage device uses an actuator assembly to support an array of vertically aligned data transducing heads adjacent recording surfaces in a disc stack.

The disc stack is rotated at a relatively high rotational velocity by a spindle motor. An actuator motor (such as a voice coil motor, VCM) pivots the actuator assembly to align the transducers with data tracks defined on the recording surfaces to write data to the tracks and retrieve previously written data from the tracks. The heads are typically hydrodynamically supported adjacent the recording surfaces by fluidic currents established by rotation of the disc stack.

A continuing trend in the industry is to provide successive generations of data storage devices with smaller sizes and increased storage capacities and data transfer rates. There is therefore a continued need for improvements in the manner in which heads are positionally controlled, both during operation and when the device is deactivated. It is to such improvements that the claimed invention is generally directed.

SUMMARY OF THE INVENTION

In accordance with preferred embodiments, the present invention is generally directed to an apparatus which provides improved positional control for an access element moveable adjacent a rotatable surface.

In accordance with some preferred embodiments, the apparatus comprises a downstream fluidic stripper assembly comprising an elongated cantilevered arm which projects proximate a rotatable surface. The cantilevered arm comprises an edge surface which extends proximate to and in facing relationship with a movement path of an access element across the rotatable surface to impede fluidic currents established by rotation of the rotatable surface.

The cantilevered arm supports a ramp structure which receivingly supports the access element at a position away from the rotatable surface and proximate an innermost diameter such as during a deactivated mode when the rotatable surface is stationary. Preferably, the rotatable surface is characterized as a data recording disc and the access element is characterized as a data transducing head of a data storage device, although such is not limiting.

The stripper assembly preferably comprises a body portion secured at a position beyond an outer extent of the rotatable surface, with the cantilevered arm projecting from the body portion coaxially adjacent and substantially parallel to the rotatable surface.

In accordance with other preferred embodiments, the apparatus comprises a rotatable surface and an access element moveable along a movement path adjacent the rotatable surface. A stationary, downstream fluidic stripper assembly comprises a cantilevered arm comprising an edge surface which extends proximate to and in facing relationship with the movement path to impede fluidic currents established by rotation of the rotatable surface.

The cantilevered arm supports a ramp structure which receivingly supports the access element at a position away from the rotatable surface and proximate an innermost diameter. As before, the rotatable surface is preferably characterized as a data recording disc and the access element is preferably characterized as a data transducing head of a data storage device.

These and various other features and advantages that characterize the claimed invention will be apparent upon reading the following detailed description and upon review of the associated drawings.

DETAILED DESCRIPTION

Figure 1:
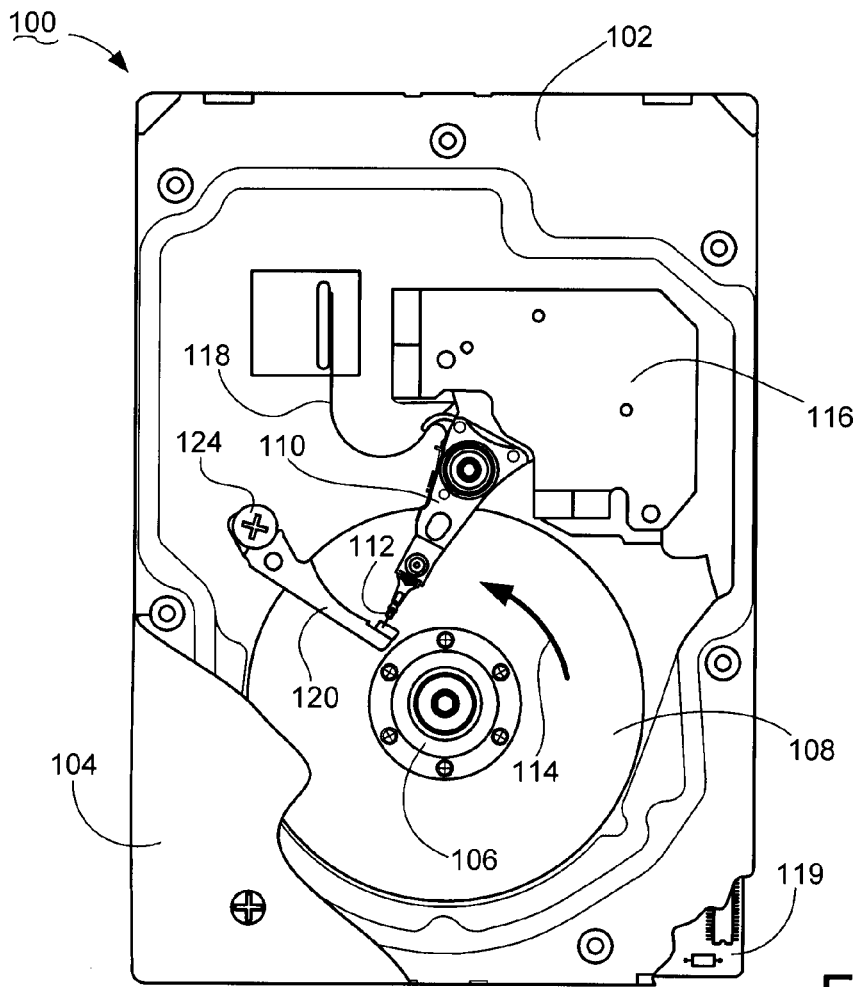
FIG. 1 is a top plan view of a data storage device which utilizes a downstream fluidic stripper assembly to effect head positioning control during operational and deactivated modes in accordance with preferred embodiments of the present invention.

While the claimed invention has utility in any number of different applications, FIG. 1 has been provided to illustrate a particularly suitable environment in which the claimed invention can be advantageously practiced.

FIG. 1 provides a top plan view of a data storage device 100 of the type configured to magnetically store and transfer digital data with a host device. The device 100 includes a base deck 102 which mates with a top cover 104 (shown in partial cut-away) to form a sealed housing.

A spindle motor 106 rotates a number of axially aligned, magnetic recording discs 108 at a constant high speed during device operation. An actuator assembly 110 positions a corresponding array of data transducing heads 112 adjacent the disc surfaces.

During operation, the heads 112 are hydrodynamically supported by fluidic (air) currents established by the high speed rotation of the discs 108. The currents, denoted generally by arrow 114, circulate within the housing along the direction of rotation of the discs 108 (in this case, generally counter-clockwise as depicted in FIG. 1).

Application of current to a voice coil motor (VCM) 116 pivots the actuator assembly 110, thereby causing the heads 112 to move radially across the disc surfaces to access data tracks (not shown) defined thereon. A flex circuit assembly 118 provides electrical communication paths between the actuator assembly 110 and control circuitry on a disc drive printed circuit board 119 mounted to the underside of the base deck 102.

A downstream fluidic stripper assembly 120 is disposed adjacent to and downstream of a movement path of the heads 112. As explained below, the stripper assembly 120 is utilized to effect head positioning control during operational and deactivated modes of the device 100.

Figure 2:
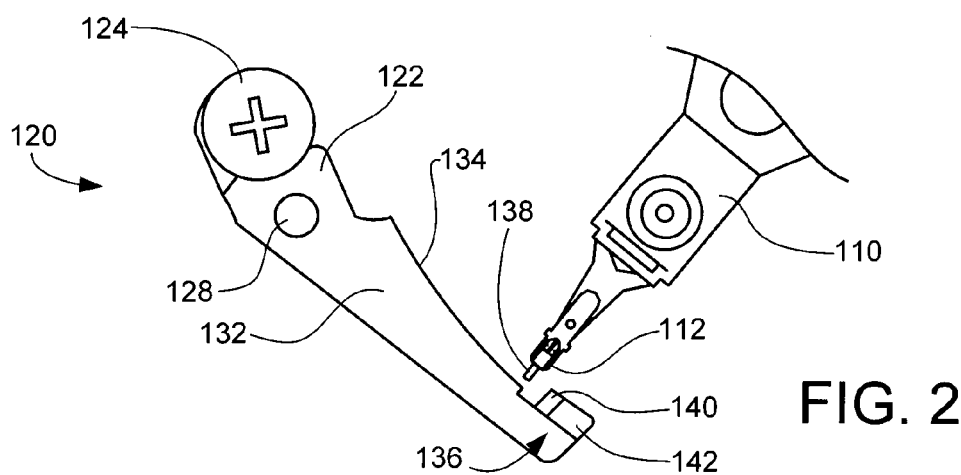
FIG. 2 shows the stripper assembly of FIG. 1 in greater detail.
Figure 3:
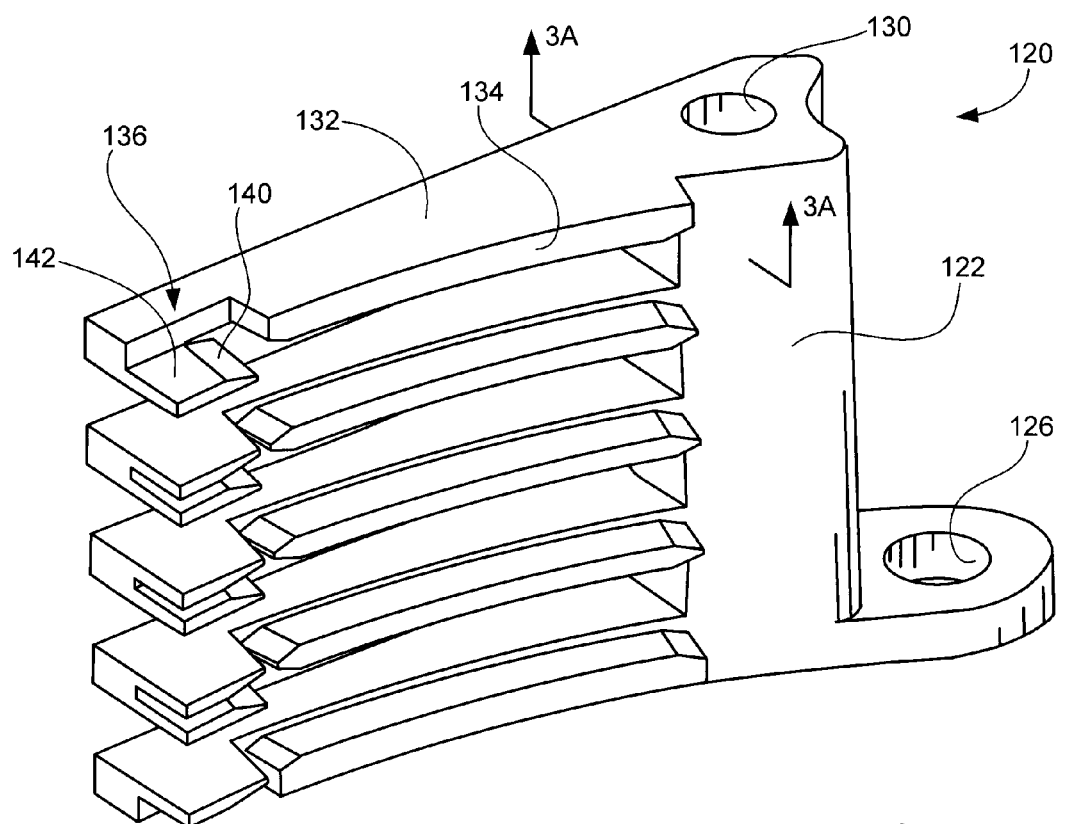
FIG. 3 is an isometric view of the stripper assembly of FIG. 2.

The stripper assembly 120 is shown in greater detail in FIGS. 2 and 3. A body portion 122 is affixed to the base deck 102 using a threaded fastener 124 which extends through an aperture 126, and an alignment pin 128 which extends through an aperture 130. The stripper assembly 120 is preferably installed by pressing the alignment pin 128 into the base deck 102, after which the stripper assembly 120 is lowered down onto the alignment pin 128, rotated into the final position and secured with the fastener 124.

A number of elongated cantilevered arms 132 project from the body portion 122, as best shown in FIG. 3. A total of five arms 132 are shown to accommodate four discs 108 in the disc stack, with the intermediary three arms being disposed between adjacent discs, the bottommost arm residing below the bottommost disc, and the topmost arm residing above the topmost disc (see FIG. 1). Other numbers of arms and discs can be utilized as desired depending on the requirements of a given application.

Figure 3A:
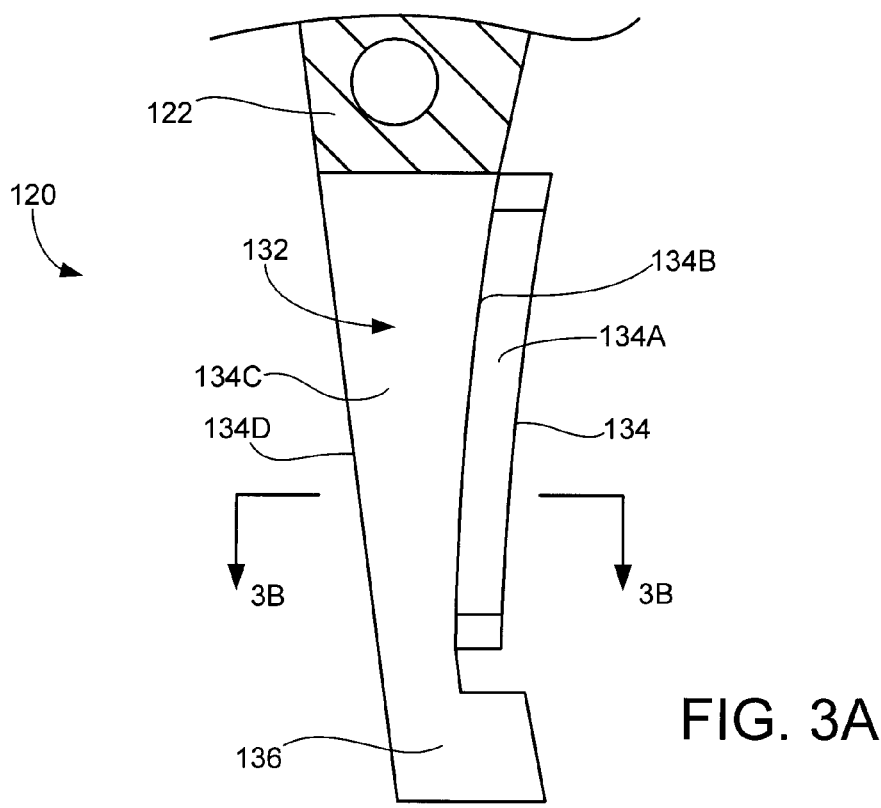
FIG. 3A generally shows a top plan, partial cross-sectional view of the stripper assembly along line 3A-3A in FIG. 3.
Figure 3B:
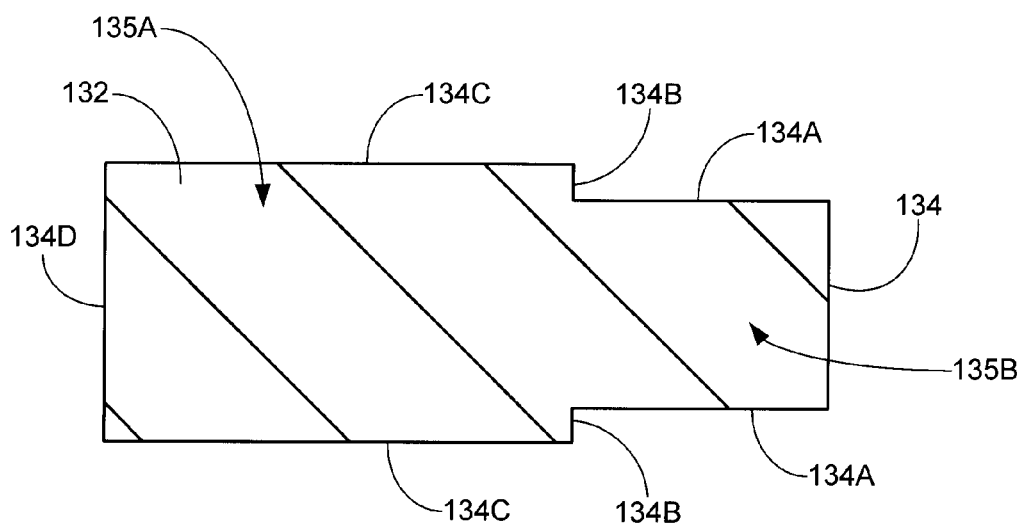
FIG. 3B generally shows a side elevational, cross-sectional view of the stripper assembly along line 3B-3B in FIG. 3A.

Each arm 132 projects from the body portion 122 so as to be coaxially adjacent and substantially parallel to one (or more) of the rotatable disc surfaces. Each arm 132 includes an edge surface 134 which extends proximate to and in facing relationship with the movement path of the associated head(s) 112. The edge surfaces serve to impede the fluidic currents 114 in the vicinity of the movement path, thereby inducing laminar flow and reducing vibrations in the actuator assembly 110 that can adversely affect head positioning. FIG. 3A is a top plan view generally taken along line 3A-3A in FIG. 3 to show a selected intermediate arm 132. FIG. 3B is a side elevational view of the arm 132 generally taken along line 3B-3B in FIG. 3A (the body portion 122 has been omitted in FIG. 3B for clarity).

As can be seen from FIGS. 3A and 3B, the arm 132 has a stepped cross-sectional shape defined by leading edge surface 134 and respective stepped surfaces 134A, 134B, 134C and 134D. The surfaces 134, 134B and 134D extend in a first direction (e.g., vertical) and the surfaces 134A and 134C extend in a second direction (e.g., horizontal) substantially orthogonal to the first direction. The stepped surfaces of the arm 132 form a localized area of increased thickness 135A that transitions to a localized area of decreased thickness 135B via transition surfaces 134A.

Each of the cantilevered arms 132 supports a ramp structure 136 for use when the device 100 enters a deactivated mode. The ramp structures 136 are configured to guide the associated head 112 toward or away from the disc 108 during head loading/unloading.

Figure 4:
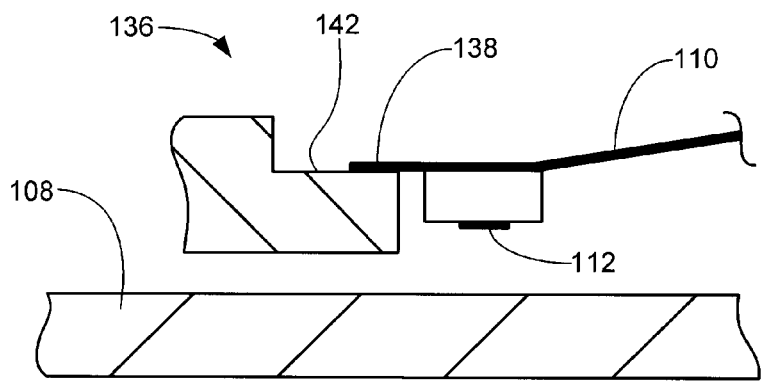
FIG. 4 schematically depicts a data transducing head in conjunction with the stripper assembly while the head is in an unloaded position on a ramp structure of the stripper assembly during a deactivated mode of the device.

More particularly, each head 112 preferably includes a forward projecting load tab 138 (FIG. 2) which is contactingly guided along an inclined ramp surface 140 and onto a shelf surface 142 to park (unload) the head 112. This places the head 112 in a safe orientation while the spindle motor 106 is de-energized and the discs 108 are brought to rest. This orientation is schematically represented in FIG. 4.

Figure 5:
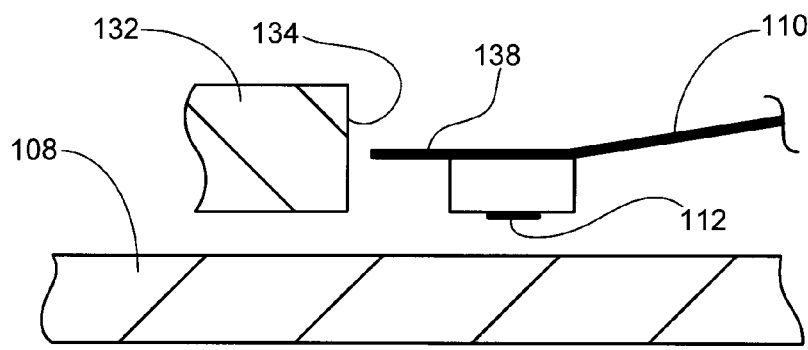
FIG. 5 schematically depicts the head in a loaded position out adjacent a data recording surface during an operational mode of the device.

When the device 100 subsequently re-enters an operational mode, the spindle motor 106 is accelerated to a velocity sufficient to hydrodynamically support the heads 112, and the load tabs 138 are guided across the shelf surfaces 142 and down the ramp surface 140 to load the head 112 out over the disc surface 108, as depicted in FIG. 5.

The stripper assembly 120 is preferably fabricated as a unitary article using an injection molding or other suitable process. The material composition of the ramp structure 136 is preferably selected to provide relatively low wear, particulation and friction characteristics.

Figure 6:
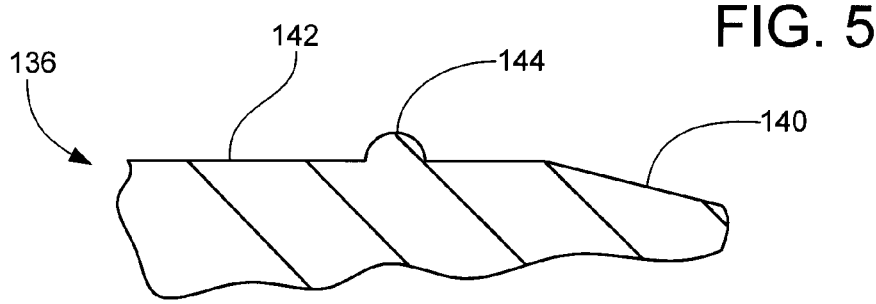
FIG. 6 illustrates the use of one or more latching features ("bumps" or "detents") on the ramp structure.
Figures 7, 8, 9:
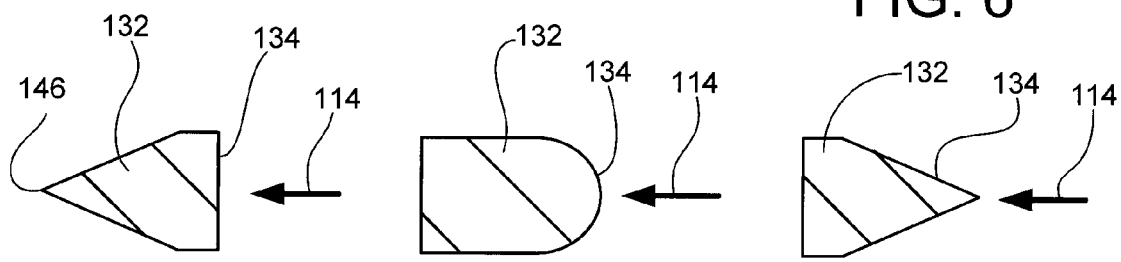
FIGS. 7-9 illustrate various alternative configurations for the leading edge of the stripper assembly.

FIG. 6 illustrates a latching feature 144 ("bump" or "detent"), one or more of which can be advantageously formed on the shelf surface 142 to retain the load tab 138 once the head 112 is unloaded. The edge surface 134 of each cantilevered arm 132 can be additionally tailored to provide desired fluidic flow characteristics for a given application. FIG. 7 illustrates the configuration of the arm 132 as a dam so that the edge surface 134 has a greater thickness (and hence, profile) than remaining portions of the arm 132. In FIG. 7, the arm thickness ultimately tapers to a downstream point 146.

FIGS. 8 and 9 illustrate alternative tapered edge surfaces 134 which present a reduced thickness, and hence profile, as compared to remaining portions of the arm 132. Other profiles are readily envisioned, including a "diamond" or "blade" profile (such as, for example, combining FIGS. 7 and 9).

The ramp structures 136 have been shown to be preferably located adjacent the innermost diameter (ID) of the discs 108. This advantageously increases the available data recording area for a skew limited actuator geometry (as in FIG. 1) by allowing movement of the outermost diameter of the data recording zone nearer to the disc OD as compared to conventional ramp designs that provide ramp structures near the OD. This is because such conventional ramp designs generally require that no data be recorded in the load/unload zone (i.e., adjacent the ramp structure). For example, as depicted by Table 1, a configuration such as exemplified in FIG. 1 has been found to provide about an additional 3.8% in the available data area of each disc surface as compared to such conventional OD ramp designs, improving the overall amount of data that can be accommodated by the device 100.

TABLE 1

|  | Conventional OD Ramp | Plate with ID Ramp |
|---|---|---|
| Spin to Pivot (inches, in.) | 1.560 | 1.580 |
| Pivot to Gap (in.) | 1.260 | 1.260 |
| Slider Skew | 0.000 | 0.000 |
| Skew at OD (degrees) | 10.0 | 10.0 |
| Skew at ID (degrees) | −10.0 | −10.0 |
| OD Data Radius (in.) | 1.166 | 1.200 |
| ID Data Radius (in.) | 0.726 | 0.759 |
| Data Area (in.$^2$) | 2.615 | 2.714 |
| Data Area Increase |  | 3.8% |

Figure 10:
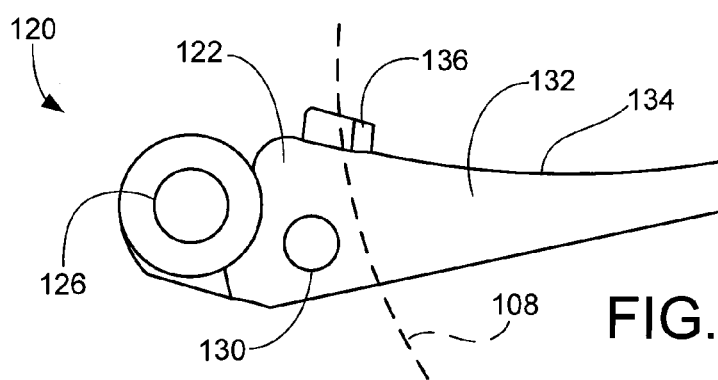
FIG. 10 provides an alternative embodiment for the stripper assembly with the ramp structures adjacent the outermost diameter (OD) of the discs.

However, other locations for the ramp structures 136 can be utilized as well, including near the outermost diameter (OD) of the discs 108, as depicted in FIG. 10.

While the foregoing illustrative embodiments have used the stripper assembly 120 in the environment of a data storage device, such is not limiting. Rather, the downstream fluidic stripper assembly can be utilized with any number of different types of rotatable surfaces with access elements including drums, tapes and disc shaped members.

Likewise, while atmospheric air has been contemplated as the fluid controlled by the disclosed fluidic stripper assembly, such is not limiting; other fluids, such as inert gasses (e.g., helium) can be alternatively controlled as well.

In view of the foregoing discussion, it will now be appreciated that the present invention, as embodied herein and as claimed below, is generally directed to an apparatus which provides improved positional control for an access element moveable adjacent a rotatable surface.

In accordance with some preferred embodiments, the apparatus comprises a downstream fluidic stripper assembly (such as 120) comprising an elongated cantilevered arm (such as 132) which projects proximate a rotatable surface, the cantilevered arm comprising an edge surface (such as 134) which extends proximate to and in facing relationship with a movement path of an access element (such as 112) across the rotatable surface to impede fluidic currents established by rotation of the rotatable surface.

The cantilevered arm supports a ramp structure (such as 136) which receivingly supports the access element at a position away from the rotatable surface. Preferably, the rotatable surface is characterized as a data recording disc (such as 108) and the access element is characterized as a data transducing head (such as 112) of a data storage device (such as 100), although such is not limiting.

The stripper assembly preferably comprises a body portion (such as 122) secured at a position beyond an outer extent of the rotatable surface, with the cantilevered arm projecting from the body portion coaxially adjacent and substantially parallel to the rotatable surface.

In accordance with other preferred embodiments, the apparatus comprises a rotatable surface (such as 108) and an access element (such as 112) moveable along a movement path adjacent the rotatable surface. A stationary, downstream fluidic stripper assembly (such as 120) comprises an elongated cantilevered arm (such as 132) comprising an edge surface (such as 134) which extends proximate to and in facing relationship with the movement path to impede fluidic currents established by rotation of the rotatable surface.

The cantilevered arm supports a ramp structure (such as 136) which receivingly supports the access element at a position away from the rotatable surface. As before, the rotatable surface is preferably characterized as a data recording disc and the access element is preferably characterized as a data transducing head of a data storage device (such as 100).

For purposes of the appended claims, the term "downstream" will be understood consistent with the foregoing description to describe the relative orientation of the access element 112, the facing edge surface 134 and the direction of disc rotation as shown in FIG. 1 so that the fluidic currents (depicted at 114) pass the access element immediately prior to passing the edge surface.

Thus, in accordance with this definition, using the same orientation of the edge surface and access element in FIG. 1, but reversing the rotation of the discs 108 in FIG. 1 in the opposite direction as that shown would transform the stripper assembly into an "upstream" assembly and hence, would be specifically excluded from this definition of downstream.

The term "elongated" will be understood to describe a longitudinally arranged article with a greater length dimension than width dimension, as exemplified by the arms 134.

The recited "first means" will be understood to correspond to the disclosed downstream fluidic stripper assembly 120, including the various embodiments depicted in FIGS. 1-10 with an elongated cantilevered arm. Upstream structures, and non-elongated structures, are explicitly excluded from the definition of an equivalent.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. An apparatus comprising a downstream fluidic stripper assembly comprising an elongated cantilevered arm which projects proximate a rotatable surface having an innermost diameter, the cantilevered arm comprising a stepped cross-sectional shape with a leading edge surface which extends proximate to and in facing relationship with a movement path of an access element across the rotatable surface to impede fluidic currents established by rotation of the rotatable surface, the cantilevered arm supporting a ramp structure which receivingly supports the access element at a position away from the rotatable surface and proximate the innermost diameter.

2. The apparatus of claim 1, wherein the stripper assembly further comprises a body portion secured at a position beyond an outer extent of the rotatable surface, wherein the cantilevered arm projects from the body portion to extend substantially parallel to the rotatable surface.

3. The apparatus of claim 1, wherein the rotatable surface is characterized as a recording surface of a data recording disc and the access element is characterized as a data transducing head of a data storage device.

4. The apparatus of claim 1, wherein the access element is hydrodynamically supported by the fluidic currents established by rotation of the rotatable surface.

5. The apparatus of claim 1, wherein the rotatable surface is characterized as a disc.

6. The apparatus of claim 1, wherein the leading edge surface extends in a first direction away from the rotatable surface, wherein the stepped cross sectional shape of the cantilevered arm further comprises a second surface which extends in the first direction, and wherein said stepped cross-sectional shape further comprises a third surface which extends between and interconnects the leading edge surface and the second surface in a second direction substantially orthogonal to the first direction.

7. The apparatus of claim 1, wherein the ramp structure comprises an inclined surface which is skewed with respect to the movement path of the access element so that the access element passes along the inclined surface as the ramp structure receives said element.

8. The apparatus of claim 1, wherein the stepped cross-sectional shape has a localized area of increased thickness that transitions to a localized area of decreased thickness with a substantially lateral sidewall, wherein the edge surface comprises a leading edge of the localized area of decreased thickness.

9. The apparatus of claim 1, wherein the edge surface comprises a first stepped transition and a second stepped transition on opposing sides of the cantilever arm.

10. An apparatus, comprising:
a rotatable surface;
an access element moveable along a movement path adjacent the rotatable surface; and
a stationary, downstream fluidic stripper assembly comprising an elongated cantilevered arm comprising a stepped cross-sectional shape with a leading edge surface which extends proximate to and in facing relationship with the movement path to impede fluidic currents established by rotation of the rotatable surface, the cantilevered arm supporting a ramp structure which receivingly supports the access element at a position away from the rotatable surface, the ramp structure comprising a latching feature which inhibits movement of the access element along the inclined surface.

11. The apparatus of claim 10, wherein the rotatable surface is characterized as a recording surface of a data recording disc and the access element is characterized as a data transducing head of a data storage device.

12. The apparatus of claim 10, wherein the access element is hydrodynamically supported by fluidic currents established by rotation of the rotatable surface.

13. The apparatus of claim 10, wherein the ramp structure comprises an inclined surface which is skewed with respect to the movement path of the access element so that the access element passes along the inclined surface as the ramp structure receives said element.

14. The apparatus of claim 10, wherein the edge surface is characterized as a dam comprising a localized increase in thickness as compared to remaining portions of the cantilevered arm to restrict fluidic flow of the fluidic currents.

15. The apparatus of claim 10, wherein the edge surface is characterized as a tapered surface comprising a localized decrease in thickness as compared to remaining portions of the cantilevered arm to enhance laminar flow across the arm.

16. The apparatus of claim 10, wherein the leading edge surface extends in a first direction away from the rotatable surface, wherein the stepped cross-sectional shape of the cantilevered arm further comprises a second surface which extends in the first direction, and wherein said stepped cross-sectional shape further comprises a third surface which extends between and interconnects the leading edge surface and the second surface in a second direction substantially orthogonal to the first direction.

17. The apparatus of claim 16, wherein the disc comprises an innermost diameter (ID) and an outermost diameter (OD), and wherein the ramp structure is supported proximate a selected one of the ID and OD.

18. An apparatus comprising a downstream fluidic stripper assembly comprising an elongated cantilevered arm which projects proximate a rotatable surface, the cantilevered arm having a stepped cross-sectional shape and comprising an edge surface which extends proximate to and in facing relationship with a movement path of an access element across the rotatable surface to impede fluidic currents established by rotation of the rotatable surface, the cantilevered arm supporting a ramp structure which receivingly supports the access element at a position away from the rotatable surface, the edge surface characterized as a being a selected one of: a dam comprising a localized increase in thickness as compared to remaining portions of the cantilevered arm; or, a tapered surface comprising a localized decrease in thickness as compared to remaining portions of the cantilevered arm.

* * * * *